Dec. 7, 1943.　　　　G. HEDING　　　　2,336,095
QUICK-CHANGE CHUCK
Filed April 14, 1941
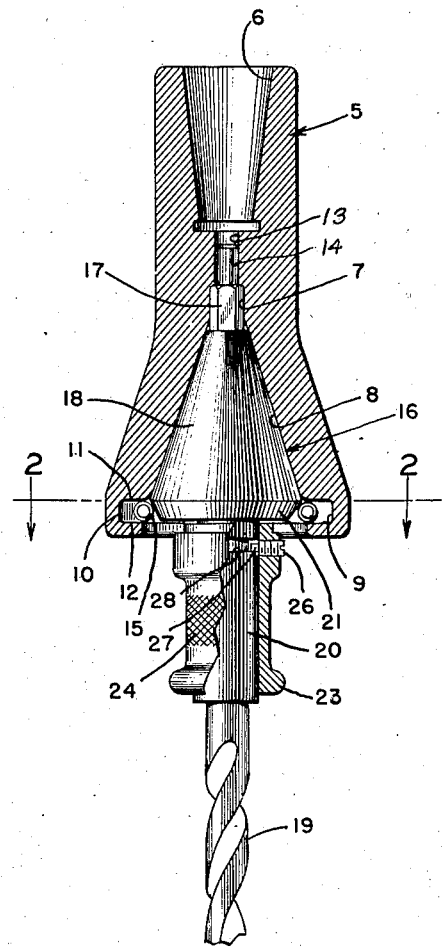
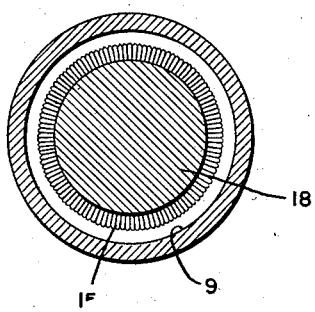
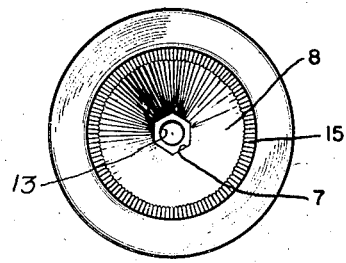
INVENTOR
GUSTAVE HEDING
BY *H.B. Whitfield*
ATTORNEY Patented Dec. 7, 1943

2,336,095

UNITED STATES PATENT OFFICE 2,336,095

QUICK-CHANGE CHUCK

Gustave Heding, Chicago, Ill., assignor to Teletype Corporation, Chicago, Ill., a corporation of Delaware Application April 14, 1941, Serial No. 388,449

1 Claim. (Cl. 279—79)

The present invention relates to tool holding devices and more particularly to a tool and cooperating chuck construction whereby the tool may be inserted or removed from the chuck during rotation of the chuck at high speeds.

In many manufacturing operations it becomes desirable to provide means for quickly changing a spindle driven tool, and accordingly numerous chucks and cooperating tool structures have been built for connecting a variety of tools to a driven spindle. When it is desirable to perform this operation without interrupting the rotation of the spindle, numerous factors must be considered such as safety and complexity. In the past, numerous chucks have been designed with these ends in view and the majority of them that were safe to use utilized relatively complex mechanisms.

Accordingly, it is an object of the present invention to provide a simple, safe, and inexpensive chucking mechanism into which tools may be inserted and from which tools may be withdrawn without interrupting the rotation of the chuck.

In accordance with the preferred embodiment of the invention, a chuck has been provided which has a central bore for receiving the spindle of a drilling or like apparatus. The central bore of the chuck, beyond the point to which the spindle of the driving mechanism extends, is provided with a cylindrical recess and a flat sided surface which will conjunctively guide, grip and drive a similarly shaped tool or tool holder which is inserted into the chuck to that point. A further continuation of the central bore of the chuck spreads outwardly so that a conically shaped tool or tool-holder may be inserted therein and will be guided to a position where a flat sided projection next to the extreme end of the tool or tool holder may engage with the flat sides of the bore at the end of the chuck toward the spindle receiving portion. At the end of the chuck which is adapted to receive the tool, there is formed a channel adjacent the sloping sides of the tool receiving bore and into this channel a spring of the garter type is forced, the spring having its convolutions tightly abutting one another when it is in position in the channel such that it will not fall from the channel. The annular channel formed in the outer end of the chuck is of sufficient depth to allow the expansion of the garter spring when the spring is engaged by a conical shank of the tool upon the insertion of the tool into the central bore of the chuck. The tool or tool holding element is provided with a sleeve which is freely rotatable thereon so that the tool may be grasped manually for insertion or removal from the chuck while the latter is rotating.

A better understanding of the invention may be had by reference to the following detailed description thereof when considered in conjunction with the accompanying drawing, wherein Fig. 1 is a front elevational view partly in section of a chuck and tool embodying the present invention;

Fig. 2 is a sectional view taken along the lines 2—2 of Fig. 1 in the direction of the arrows; and Fig. 3 is a view of the chuck with the tool removed from it looking into the central bore of the chuck at the tool receiving end.

Referring now to the drawing wherein like reference characters designate the same parts throughout the several views, in Fig. 1 there is shown a chuck designated by the numeral 5 having a tapered central bore at its upper end designated 6 which is designed to receive the spindle of a drill press or other material working apparatus. This chuck may be secured to the spindle, not shown, in any suitable manner and when fixed in position on the spindle of the apparatus will be prepared to receive a suitably shaped tool or tool holder having a tool in it. Communicating with the spindle bore 6 is a round bore 13 and next adjacent to it is a bore 7 which is flat sided. In the present embodiment of the invention, the flat sides are six in number and form a hexagonal bore. The hexagonal bore 7 further communicates with a tapering or conical bore 8 which extends down almost to the bottom of the chuck where it terminates in an annular channel 9. The channel 9 is formed radially outwardly from the inner face of the bore of the chuck and has an axially extending base 10 and radially extending channel walls 11 and 12.

Seated in the channel 9 is a garter spring 15, the convolutions of which are each adjoining the next abutting one of the convolutions so that in order to insert the garter spring 15 in the channel 9 it is necessary to deform the garter spring from its normal plane and insert a portion of it at a time. Due to the fact that each of the adjacent pairs of convolutions of the garter spring 15 are in abutting relation when the spring is relaxed, there is no possibility of the spring falling from the channel 9 during rotation of the chuck at high speed.

As shown in Fig. 1, a tool 16 which has its tool holding shank formed integrally with it is provided for cooperation with the chuck 5. The tool 16 has a cylindrical tip 14, a hexagonal driving section 17, a conical intermediate portion 18, and a cutting portion 19. In the specific embodiment of the invention disclosed herein the tool 16 is a drill, but it will be understood that any one of a number of tools might be provided and that the drill which is shown is simply illustrative of the invention. At the juncture of the shank 20 and the conical portion 18 of the tool, the conical portion has a beveled edge as shown at 21 formed thereon so that the surfaces of the conical portion 18 will serve as a cam to engage the spring 15 and expand it when the tool is inserted in the chuck, whereas the beveled portion 21 will serve as a cam to expand the spring 15 when the tool is withdrawn from the chuck.

On the shank 20 of the tool 16 there is provided a sleeve 23 which has a knurled outer surface as shown at 24 and which is freely rotatable about the shank 20 of the tool, being held in place on the tool by a set screw 26 which is threaded into the sleeve 23 and which has a tip portion 27 extending into a groove 28 formed in the shank of the tool. This sleeve constitutes a handle for the tool by which it may be grasped while it is rotating during the insertion of the tool in the chuck or its removal therefrom.

As will be apparent by reference to the various figures of the drawing, the tool may readily be inserted in the chuck. When the tool is inserted in the chuck, the hexagonal portion 17 will first engage the side walls of the cone shaped bore of the chuck and will be guided thereby into the hexagonal bore 7 in the chuck. Thereafter the cylindrical lead pin 14 and the hexagonal driving portion 17 will enter their respective complementary recesses 13 and 7 and hold the conical section 18 on the tool 16 in concentric alignment with the conical bore 8 of the chuck 5 for the remaining part of the uniting stroke. A similar guiding action obtains during the initial movement of the tool upon removal thereof at which time the beveled cam portion 21 engages the spring 15 to effect its expansion. In this manner, spring 15 is uniformly expanded or contracted by the cam action of the conical portion 18 or the beveled cam portion 21. As the cone shaped portion 18 of the tool 16 almost seats itself in the conical aperture or bore 8, the sloping sides of the tool will engage the spring 15 and expand it uniformly radially outwardly until the tool is completely seated with the hexagonal portion 17 engaging the hexagonal bore 7 and the sides of the cone shaped portion 18 engaging the side walls of the conical bore 8, at which time the spring 15 will have passed over the ridge between the beveled portion 21 and the conical portion 18 and will engage the beveled cam portion 21 to hold the tool in the chuck. At this time the garter spring 15 remains under tension and because of its tendency to contract to its normal position, it pushes against the beveled portion 21 of the shank to exert an upward force thereon, thereby to cause the tool to be continuously urged upwardly and retained firmly within the chuck. In order to change tools, an operator may grasp the knurled sleeve 23 and pull the tool from the chuck without interrupting the operation of the spindle on which the chuck is mounted and may then insert another tool in the manner described hereinbefore.

Although a specific embodiment of the invention has been described hereinbefore, it will be understood that numerous modifications and adaptations thereof may be made without departing from the scope of the invention which is limited only by the appended claim.

What is claimed is:

In a quick-change chucking device, an integral receptacle for interchangeable tool collets comprising a conically recessed body internally skirted with an annular groove, a garter spring housed in said groove having an internal diameter during relaxed condition smaller than that of the base of the conical recess but elastically distensible within said groove to a condition of enlargement whence its internal diameter is equal to or greater than that of said base, a collet for integral association with a rotary processing tool comprising a conical body conforming with the conical recess of said receptacle, a reverse truncated conical portion adjacent the base of said body forming an obtuse angled ridge therewith of diameter greater than said garter spring's relaxed internal diameter but less than its distensible diameter, and means for maintaining parallelism between said collet and said receptacle during chucking engagement comprising a concentric bore in said receptacle at the apex of said conical recess, and a guide pin integral with said collet in corresponding relationship to its conical body of length to be received within said bore substantially in advance of the engagement between said obtuse angled ridge and said spring.

GUSTAVE HEDING.